United States Patent
Zhang et al.

(10) Patent No.: US 11,070,090 B2
(45) Date of Patent: Jul. 20, 2021

(54) RESONANCE-TYPE CONTACTLESS POWER SUPPLY, INTEGRATED CIRCUIT AND CONSTANT VOLTAGE CONTROLLING METHOD THEREFOR

(71) Applicant: SILERGY SEMICONDUCTOR TECHNOLOGY (HANGZHOU) LTD., Hangzhou (CN)

(72) Inventors: Wang Zhang, Hangzhou (CN); Feng Yu, Hangzhou (CN)

(73) Assignee: SILERGY SEMICONDUCTOR TECHNOLOGY (HANGZHOU) LTD., Hangzhou (CN)

( * ) Notice: Subject to any disclaimer, the term of this patent is extended or adjusted under 35 U.S.C. 154(b) by 27 days.

(21) Appl. No.: 16/677,202

(22) Filed: Nov. 7, 2019

(65) Prior Publication Data

US 2020/0076236 A1    Mar. 5, 2020

Related U.S. Application Data

(62) Division of application No. 14/798,680, filed on Jul. 14, 2015, now Pat. No. 10,604,248.

(30) Foreign Application Priority Data

Jul. 14, 2014   (CN) .......................... 201410335026.1

(51) Int. Cl.
*H02J 50/12* (2016.01)
*H01F 38/14* (2006.01)
(Continued)

(52) U.S. Cl.
CPC .............. *H02J 50/12* (2016.02); *H01F 38/14* (2013.01); *H02M 3/3376* (2013.01); *H02M 7/4815* (2021.05); *Y02B 70/10* (2013.01)

(58) Field of Classification Search
CPC . H02J 50/12; H02J 17/00; H02J 5/005; H01F 38/14; H02M 3/3376
(Continued)

(56) References Cited

U.S. PATENT DOCUMENTS

| 9,225,241 B2 | 12/2015 | Lee | |
|---|---|---|---|
| 2004/0130916 A1* | 7/2004 | Baarman | H02J 50/12 363/21.02 |

(Continued)

FOREIGN PATENT DOCUMENTS

| CN | 201742175 U | 2/2011 |
|---|---|---|
| CN | 103522902 A | 1/2014 |

(Continued)

OTHER PUBLICATIONS

First Office Action, including Search Report, for Chinese Patent Application No. 201410335026.1, dated Sep. 30, 2015, 11 pages.
(Continued)

*Primary Examiner* — Alfonso Perez Borroto
(74) *Attorney, Agent, or Firm* — Westman, Champlin & Koehler, P.A.

(57) ABSTRACT

The present disclosure relates to a resonance-type contactless power supply, an integrated circuit and a constant voltage control method. The resonance-type contactless power supply includes an inverter, a transmitter-side resonant circuit, a receiver-side resonant circuit, a rectifier circuit, and an output capacitance. In this resonance-type contactless power supply, the inverter receives electric energy, which is transferred to the rectifier circuit in a first state and is not transferred to the rectifier circuit in a second state. By switching between the first state and the second state, the resonance-type contactless power supply is controlled to provide a relatively constant voltage, and can be electrically coupled directly to a constant-voltage-type load.

9 Claims, 4 Drawing Sheets

(51) Int. Cl.
*H02M 3/337* (2006.01)
*H02M 7/48* (2007.01)

(58) Field of Classification Search
USPC .......................................................... 307/104
See application file for complete search history.

(56) References Cited

U.S. PATENT DOCUMENTS

| | | | |
|---|---|---|---|
| 2012/0153903 A1 | 6/2012 | Kim et al. | |
| 2013/0147427 A1* | 6/2013 | Polu .................. | B60L 53/36 320/108 |
| 2014/0015336 A1* | 1/2014 | Weber .................. | H02J 7/0047 307/104 |
| 2015/0207336 A1* | 7/2015 | Morreale ............ | H02J 7/00034 307/104 |
| 2015/0326061 A1* | 11/2015 | Davison .................. | H02J 7/025 320/108 |
| 2017/0008385 A1* | 1/2017 | Fujimoto ............. | B60K 7/0007 |

FOREIGN PATENT DOCUMENTS

| | | |
|---|---|---|
| CN | 103840663 A | 6/2014 |
| CN | 104009555 A | 8/2014 |
| CN | 104037956 A | 9/2014 |
| KR | 20100085699 A | 7/2010 |

OTHER PUBLICATIONS

Second Office Action, including Search Report, for Chinese Patent Application No. 201410335026.1, dated May 23, 2016, 12 pages.
USPTO-issued prosecution history for U.S. Appl. No. 14/798,680, filed Jul. 14, 2015, including: Requirement for Restriction/Election dated Apr. 30, 2018, 9 pages; Non-Final Rejection dated Oct. 4, 2018, 13 pages; Final Rejection dated Apr. 30, 2019, 14 pages; and Ex parte Quayle Action issued Aug. 29, 2019, 6 pages; 42 pages.

* cited by examiner

US 11,070,090 B2

RESONANCE-TYPE CONTACTLESS POWER SUPPLY, INTEGRATED CIRCUIT AND CONSTANT VOLTAGE CONTROLLING METHOD THEREFOR

CLAIM OF PRIORITY

This application is a divisional application of U.S. application Ser. No. 14/798,680, filed on Jul. 14, 2015, which published as U.S. 2016/0013663 A1 on Jan. 14, 2016, and claims priority to Chinese Application No. 201410335026.1, filed Jul. 14, 2015 (published as CN 104079079 A), the contents of which are hereby incorporated by reference.

BACKGROUND OF THE DISCLOSURE

Field of the Disclosure

The present disclosure relates to the field of power electronics, and more particularly, to a resonance-type contactless power supply, an integrated circuit and a constant voltage control method.

Description of the Related Art

Contactless power supply is widely used in electronic products, especially in low-power electronic products such as cellular phones, MP3 players, digital cameras, laptop computers, and the like, due to their convenience and availability. A conventional resonance-type contactless power supply typically has a resonance and magnetic coupling circuit, including a transmitting coil L1 and a receiving coil L2. The transmitting coil L1 and other components in a power transmitter constitute a transmitter-side resonant circuit. The receiving coil L2 and other components in a power receiver constitute a receiver-side resonant circuit. Electric energy is transferred in a contactless manner when the transmitter-side resonant circuit and the receiver-side resonant circuit have the same resonance frequency. The receiver-side resonant circuit is coupled to the transmitter-side resonant circuit by electromagnetic field, and thus resonates when the transmitter-side resonant circuit resonates. Typically, the above resonance frequency is referred to as a self-inductance resonance frequency.

When operating in the self-inductance resonance frequency, the conventional resonance-type contactless power supply functions as a current source and provides a relatively constant current to a load. Thus, the resonance-type contactless power supply cannot be used for a load which needs a constant voltage.

BRIEF DESCRIPTION OF THE DISCLOSURE

In view of this, the present disclosure provides a resonance-type contactless power supply, an integrated circuit and a constant voltage control method for providing a relatively constant voltage, so that the resonance-type contactless power supply can be directly used for a load which needs a constant voltage.

In a first embodiment, there is provided a resonance-type contactless power supply comprising:

an inverter configured to receive electric energy and output an AC current with a self-inductance resonance frequency;

a transmitter-side resonant circuit comprising a transmitting coil for receiving the AC current from the inverter;

a receiver-side resonant circuit comprising a receiving coil which is separated from but electrically coupled to the transmitting coil in a contactless manner, and configured to receive electric energy from the transmitting coil;

a rectifier circuit being electrically coupled to the receiver-side resonant circuit;

an output capacitance being connected in parallel at an output of the rectifier circuit;

a state switching circuit configured to control the receiver-side resonant circuit to output the AC current to the rectifier circuit in the first state, and to connect an input terminal of the rectifier circuit to ground in the second state; and a control circuit configured to switch the state switching circuit between the first state and the second state so that the rectifier circuit outputs a constant output voltage.

Preferably, the state switching circuit comprises:

a first switch being electrically coupled between a first terminal of the input port of the rectifier circuit and ground;

a second switch being electrically coupled between a second terminal of the input port of the rectifier circuit and ground;

wherein the control circuit outputs a switching control signal in response to a feedback voltage which is in proportion to the output voltage of the rectifier circuit, for turning on or off the first switch and the second switch simultaneously.

Preferably, the control circuit increases an on time of the first switch and the second switch in each cycle when the feedback voltage increases so as to decrease a time period of the first state, and decreases the on time of the first switch and the second switch in each cycle when the feedback voltage decreases so as to increase the time period of the first state.

Preferably, the control circuit comprises:

an error amplifier circuit configured to receive the feedback voltage and a reference voltage and to provide an error compensation signal;

a comparator configured to compare the error compensation signal with a triangular wave signal to provide a pulse-width modulation signal;

a driving circuit configured to provide the switching control signal for the first switch and the second switch in response to the pulse-width modulation signal;

Preferably, the transmitting coil and the receiving coil are configured to be coupled to each other in a predetermined coupling coefficient, and when operating in the self-inductance resonance frequency, a mutual inductance between the transmitting coil and the receiving coil is equal to an equivalent load impedance of a rated load in the first state.

In a second embodiment, there is provided a resonance-type contactless power supply comprising:

an inverter configured to receive electric energy and output an AC current with a self-inductance resonance frequency in a first state, and to stop its operation in a second state;

a transmitter-side resonant circuit comprising a transmitting coil for receiving the AC current from the inverter;

a receiver-side resonant circuit comprising a receiving coil which is separated from but electrically coupled to the transmitting coil in a contactless manner, and configured to receive electric energy from the transmitting coil;

a rectifier circuit being electrically coupled to the receiver-side resonant circuit;

an output capacitance being connected in parallel at an output of the rectifier circuit; and a control circuit configured to switch the inverting circuit between the first state and the second state so that the rectifier circuit outputs a constant voltage.

Preferably, the control circuit is configured to switch the inverter circuit between the first state and the second state in response to a feedback voltage, so as to decrease a time period during which the inverter circuit maintains in the first state when the feedback voltage increases, and to increase the time period during which the inverter circuit maintains in the first state when the feedback voltage decreases.

Preferably, the control circuit comprises:

an error amplifier circuit configured to receive the feedback voltage which is in proportion to an output voltage of the rectifier circuit and a reference voltage and to provide an error compensation signal;

a comparator configured to compare the error compensation signal with a triangular wave signal to provide a pulse-width modulation signal;

an inverter controller configured to switch between the first state and the second state in response to the pulse-width modulation signal and to provide an inverter control signal which has the self-inductance resonance frequency in the first state and stops an operation of the inverter in the second state.

Preferably, the transmitting coil and the receiving coil are configured to be coupled to each other in a predetermined coupling coefficient, and when operating in the self-inductance resonance frequency, a mutual inductance between the transmitting coil and the receiving coil is equal to an equivalent load impedance of a rated load in the first state.

In a third embodiment, there is provided an integrated circuit for a resonance-type contactless power supply, comprising:

a rectifier circuit;

a state switching circuit configured to control the receiver-side resonant circuit to output the AC current to the rectifier circuit in the first state, and to connect an input terminal of the rectifier circuit to ground in the second state; and a control circuit configured to switch the state switching circuit between the first state and the second state so that the rectifier circuit outputs a constant output voltage.

Preferably, the state switching circuit comprises:

a first switch being electrically coupled between a first terminal of the input port of the rectifier circuit and ground;

a second switch being electrically coupled between a second terminal of the input port of the rectifier circuit and ground;

wherein the control circuit outputs a switching control signal in response to a feedback voltage which is in proportion to the output voltage of the rectifier circuit, for turning on or off the first switch and the second switch simultaneously.

Preferably, the control circuit increases an on time of the first switch and the second switch in each cycle when the feedback voltage increases so as to decrease a time period of the first state, and decreases the on time of the first switch and the second switch in each cycle when the feedback voltage decreases so as to increase the time period of the first state.

Preferably, the control circuit comprises:

an error amplifier circuit configured to receive the feedback voltage and a reference voltage and to provide an error compensation signal;

a comparator configured to compare the error compensation signal with a triangular wave signal to provide a pulse-width modulation signal;

a driving circuit configured to provide the switching control signal for the first switch and the second switch in response to the pulse-width modulation signal;

In a fourth embodiment, there is provided an integrated circuit for a resonance-type contactless power supply comprising:

an inverter configured to receive electric energy and output an AC current with a self-inductance resonance frequency in a first state, and to stop its operation in a second state;

a control circuit configured to switch the inverting circuit between the first state and the second state so that the resonance-type contactless power supply outputs a constant output voltage.

Preferably, the control circuit is configured to switch the inverter circuit between the first state and the second state in response to a feedback voltage, so as to decrease a time period during which the inverter circuit maintains in the first state when the feedback voltage increases, and to increase the time period during which the inverter circuit maintains in the first state when the feedback voltage decreases.

Preferably, the control circuit comprises:

an error amplifier circuit configured to receive the feedback voltage which is in proportion to an output voltage of the rectifier circuit and a reference voltage and to provide an error compensation signal;

a comparator configured to compare the error compensation signal with a triangular wave signal to provide a pulse-width modulation signal;

an inverter controller configured to switch between the first state and the second state in response to the pulse-width modulation signal and to provide an inverter control signal which has the self-inductance resonance frequency in the first state and stops an operation of the inverter in the second state.

In a fifth embodiment, there is provided a constant voltage control method for a resonance-type contactless power supply comprising an inverter, a transmitter-side resonant circuit, a receiver-side resonant circuit, a rectifier circuit and an output capacitor, comprising:

switching the resonance-type contactless power supply between the first state and the second state so that the resonance-type contactless power supply outputs a constant voltage, wherein the inverter receives electric energy, which is transferred to the rectifier circuit in a first state and is not transferred to the rectifier circuit in a second state.

Preferably, a receiver-side resonant circuit outputs an AC current to the rectifier circuit in the first state, and an input terminal of the rectifier circuit is grounded in the second state.

Preferably, the inverter circuit receives electric energy and outputs an AC current with a self-inductance resonance frequency in the first state, and the inverter stops its operation in the second state.

In this resonance-type contactless power supply, the inverter receives electric energy, which is transferred to the rectifier circuit in a first state and is not transferred to the rectifier circuit in a second state. By switching between the first state and the second state, the resonance-type contactless power supply is controlled to provide a relatively constant voltage, and can be electrically coupled directly to a constant-voltage-type load.

BRIEF DESCRIPTION OF THE DRAWINGS

The above and other objects, advantages and features of the present disclosure will become more fully understood from the detailed description given hereinbelow in connection with the appended drawings, and wherein.

DETAILED DESCRIPTION OF EMBODIMENTS OF THE DISCLOSURE

Reference will now be made in detail to particular embodiments of the disclosure, it will be understood that the scope of the present disclosure is not limited to these embodiments. Furthermore, in the following detailed description of the present disclosure, numerous specific details are set forth in order to provide a thorough understanding of the present disclosure. However, it will be readily apparent to one skilled in the art that the present disclosure may be practiced without these specific details. In other instances, well-known methods, procedures, processes, components, and circuits have not been described in detail so as not to unnecessarily obscure aspects of the present disclosure.

Furthermore, it will be understood by one skilled in the art that attached drawings are to be regarded as illustrative, and may not be drawn to scale.

Also, it will be understood in the following description that the term "circuit" refers to a conductive loop consisting of at least one component or sub-circuit which are electrically coupled or electromagnetically coupled to each other. When one component/circuit is referred to as being "connected to" another component, or one component/circuit is referred to as being "connected between" two nodes, it can be connected to or coupled to another component directly or with an intermediate component therebetween. The connection of two components can be physical or logical connection, or physical and logical connection. On the contrary, when one component is referred to as being "coupled directly to" or "connected directly to" another component, there will be no an intermediate component between two components.

Where the term "comprising" or "including" is used in the present description and claims, it does not exclude other elements or steps, unless something otherwise is specifically stated. That is, it means "including, but not limited to".

In the following description that the terms such as "first", "second" and the like are used herein for purposes of description and are not intended to indicate or imply relative importance or significance. The term "plurality", as used herein, is defined as two or more than two, unless something otherwise is specifically stated.

Figure 1:
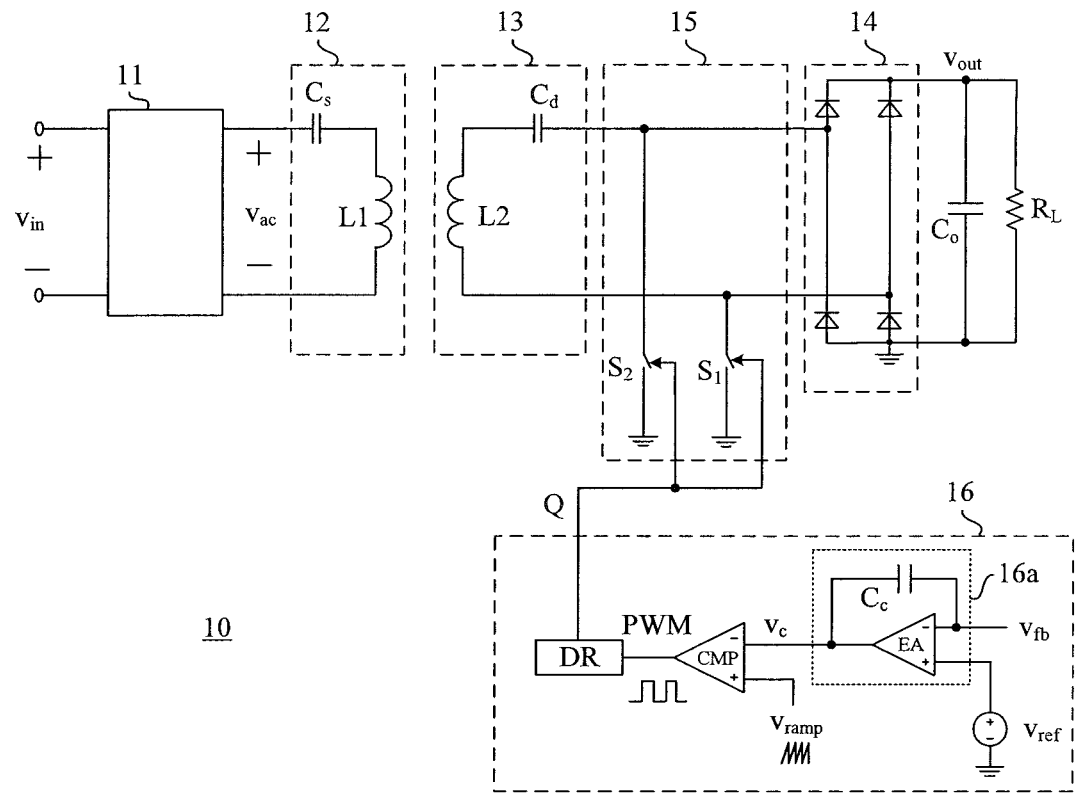
FIG. 1 is a schematic circuit diagram of an example resonance-type contactless power supply according to a first embodiment of the present disclosure.

FIG. 1 is a schematic circuit diagram of an example resonance-type contactless power supply according to a first embodiment of the present disclosure. As shown in FIG. 1, a resonance-type contactless power supply 10 includes an inverter circuit 11, a transmitter-side resonant circuit 12, a receiver-side resonant circuit 13, a rectifier circuit 14, an output capacitor $C_o$, a state switching circuit 15 and a control circuit 16.

In this embodiment, the inverter circuit 11 and the transmitter-side resonant circuit 12 constitute a power transmitter of the resonance-type contactless power supply 10. The receiver-side resonant circuit 13, the rectifier circuit 14, the output capacitor $C_o$, the state switching circuit 15 and the control circuit 16 constitute a power receiver of the resonance-type contactless power supply 10.

The power transmitter and the power receiver are separated from but electrically coupled to each other by the transmitter-side resonant circuit 12 and the receiver-side resonant circuit 13 to transfer electric energy.

The inverter circuit 11 receives electric energy and outputs an AC current $V_{ac}$ with a self-inductance resonance frequency.

The inverter circuit 11 may be a full-bridge inverter circuit, a half-bridge inverter circuit, or other inverter circuit having similar functions.

The transmitter-side resonant circuit 12 includes a transmitting coil L1 for receiving the AC voltage $V_{ac}$ from the inverter circuit 11. The transmitter-side resonant circuit 13 needs an additional transmitter-side resonance capacitor $C_s$ which is connected in series or in parallel with the transmitting coil L1 to provide a resonance circuit. The transmitter-side resonance capacitor $C_s$ is used for balancing leakage inductance of the transmitter-side resonant circuit 13, reflected inductance of the receiver-side resonant circuit 14 and parasitic inductance due to parasitic parameters of the circuit, eliminating voltage spike and surge current at a high frequency due to the parasitic parameters of the circuit, suppressing electromagnetic interference and power supply noise so as to decrease apparent power of the power supply, and increasing power factor of the power supply. Obviously, one skilled in the art can understand that in some cases, distributed capacitance (for example, among wires of the transmitting coil) of the circuit may be used as the transmitter-side resonance capacitor so that an additional capacitor can be omitted in the circuit.

The receiver-side resonant circuit 13 includes a receiving coil L2. The receiving coil L2 is electrically coupled to the transmitting coil L2 in the transmitter-side resonant circuit 12 in a detachable and contactless manner The receiver-side resonant circuit 13 receives electric energy from the transmitting coil L1.

Meanwhile, the receiver-side resonant circuit 13 needs an additional receiver-side resonant capacitor $C_d$ for decreasing reactive power at a receiver-side and increasing active power transferred by the resonance and magnetic coupling circuit. As mentioned above, distributed capacitance (for example, among wires of the coil) of other components in the circuit may be used as the receiver-side resonant capacitor $C_d$ so that an additional capacitor can be omitted in the circuit.

The transmitter-side resonant circuit 12 and the receiver-side resonant circuit 13 constitute the resonance and magnetic coupling circuit.

Figure 2:
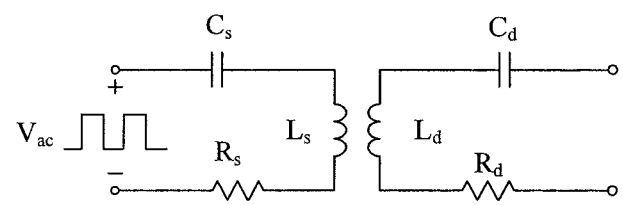
FIG. 2 is an equivalent circuit diagram of a resonance and magnetic coupling circuit in the example resonance-type contactless power supply according to one embodiment of the present disclosure.

FIG. 2 is an equivalent circuit diagram of a resonance and magnetic coupling circuit, i.e. a combination of a transmitter-side resonant circuit 12 and a receiver-side resonant circuit 13, in the example resonance-type contactless power supply according to one embodiment of the present disclosure.

As shown in FIG. 2, the transmitting coil L1 is equivalent to a first ideal coil $L_s$ and a coil resistor $R_s$, and the receiving coil L2 is equivalent to a second ideal coil $L_d$ and a coil resistor $R_d$. The first ideal coil $L_s$ is coupled to the second ideal coil $L_d$. In FIG. 2, the transmitter-side resonant circuit 12 and the receiver-side resonant circuit 13 are each series resonance circuits. The transmitter-side resonant circuit 12 further includes a transmitter-side resonance capacitor $C_s$, and the receiver-side resonant circuit 13 further includes a receiver-side resonant capacitor $C_d$. As mentioned above, the transmitter-side resonance capacitor $C_s$ and the receiver-side resonant capacitor $C_d$ may be achieved by additional components or distributed parameters of other components.

Thus, the resonance and magnetic coupling circuit constitutes a mutual-inductance coupling circuit.

Typically, the transmitter-side resonant circuit 12 and the receiver-side resonant circuit 13 have the same resonance frequency so that electric energy can be transferred in a resonant manner as follows, $$f_s = 1/2\pi \cdot \sqrt{L_s \cdot C_s} = 1/2\pi \cdot \sqrt{L_d \cdot C_d} = f_d$$

wherein $f_s$ is a resonance frequency of the transmitter-side resonant circuit 12, $f_d$ is a resonance frequency of the receiver-side resonant circuit 13, $L_s$ is an inductance value of the first ideal coil $L_s$, $L_d$ is an inductance value of the second ideal coil $L_d$, $C_s$ is a capacitance value of the transmitter-side resonance capacitor, and $C_d$ is a capacitance value of the receiver-side resonant capacitor.

Preferably, the inductance value of the first ideal coil $L_s$ may be set to be equal to the inductance value of the second ideal coil $L_d$, and the capacitance value $C_s$ of the transmitter-side resonance capacitor may be set to be equal to the capacitance value $C_d$ of the receiver-side resonant capacitor so that the receiver-side resonant capacitor 12 and the receiver-side resonant circuit 13 have the same resonance frequency.

Typically, the above resonance frequency is referred to as a self-inductance resonance frequency. When operating at the above resonance frequency, the receiver-side resonant capacitor 12 and the receiver-side resonant circuit 13 resonate simultaneously, and impedances of inductors and capacitors in the resonance and magnetic coupling circuit are canceled out. The system efficiency is thus optimized.

Figure 3:
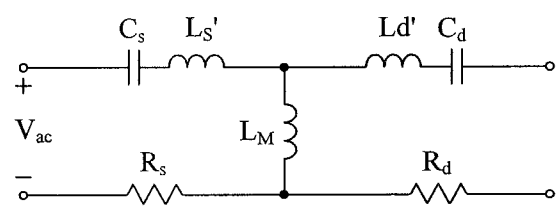
FIG. 3 is an equivalent circuit diagram of a resonance and magnetic coupling circuit in a decoupling state in the example resonance-type contactless power supply according to one embodiment of the present disclosure.

FIG. 3 is an equivalent circuit diagram of a resonance and magnetic coupling circuit in a decoupling state in the example resonance-type contactless power supply according to one embodiment of the present disclosure. As shown in FIG. 3, because the coupling of the transmitting coil L1 and the receiving coil L2 includes leakage inductance and mutual inductance, the resonance and magnetic coupling circuit as shown in FIG. 2 can be equivalent to the circuit as shown in FIG. 3, where the ideal coils $L_s$ and $L_d$ are coupled to each other but represented here by transmitter-side leakage inductance $L_s'$, receiver-side leakage inductance $L_d'$, and mutual inductance $L_M$. Accordingly, the resonance and magnetic coupling circuit as shown in FIG. 2 may be further equivalent to a two-port network as shown in FIG. 3.

Figure 4:
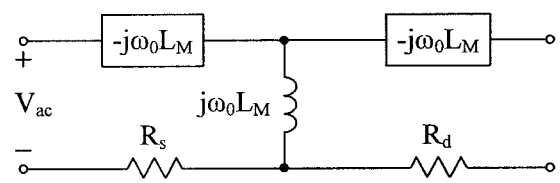
FIG. 4 is a schematic diagram showing parameters of the equivalent circuit in FIG. 3 when operating in a self-inductance resonance frequency.

FIG. 4 is a schematic diagram showing parameters of the equivalent circuit in FIG. 3 when operating in a self-inductance resonance frequency. As shown in FIG. 4, a series circuit of the transmitter-side leakage inductance $L_s'$ and the transmitter-side resonance capacitor $C_s$ has an equivalent impedance $-j\omega_0 L_M$ when the inverter circuit 11 provides an AC voltage $V_{ac}$ with a self-inductance resonance frequency $\omega_0$ to the transmitter-side resonant circuit 12. Thus, the impedance of the mutual inductance can be canceled out. An input port of the power transmitter has a minimized impedance, and the transmitter-side resonant circuit resonates. Meanwhile, a series circuit of the receiver-side leakage inductance $L_d'$ and the receiver-side resonant capacitor $C_d$ has an equivalent impedance $-J\omega_0 L_M$, so that an output port of the power receiver has a minimized impedance, and the receiver-side resonant circuit resonates.

Here, the system has a conversion efficiency η as follows, $$\eta = \frac{R_L}{R_s \left[ \left( \frac{R_L + R_d}{\omega_0 L_M} \right)^2 \right] + R_L + R_d}$$

wherein $R_L$ is an equivalent load impedance of a rated load when operating in a first state. Assuming $R_s$ has a value equal to that of $R_d$, the system has a conversion efficiency η with a maximum value when $\omega_0 L_M = R_L$. The transmitting coil L1 and the receiving coil L2 have a relatively constant coupling coefficient in a normal operation state. Inductance values of the transmitting coil L1 and the receiving coil L2 are selected so that an impedance $\omega_0 L_M$ of the mutual inductance between the transmitting coil L1 and the receiving coil L2 is equal to an equivalent load impedance $R_L$ of a rated load in the first state when the two coils are coupled to each other in a predetermined coupling coefficient, and when operating in the self-inductance resonance frequency $\omega_0$. Accordingly, the equivalent load impedance $R_L$ is equal to $\omega_0 L_M$ in the first state, which increases the conversion efficiency of the system.

Figure 5:
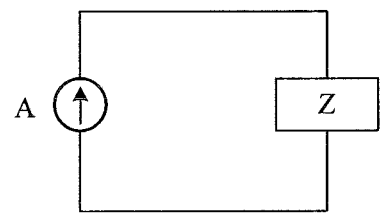
FIG. 5 is a simplified equivalent circuit diagram of a resonance and magnetic coupling circuit in the example resonance-type contactless power supply according to one embodiment of the present disclosure.

FIG. 5 is a simplified equivalent circuit diagram of a resonance and magnetic coupling circuit in the example resonance-type contactless power supply according to one embodiment of the present disclosure. When operating in the self-inductance resonance frequency $\omega_0$, the resonance and magnetic coupling circuit of the resonance-type contactless power supply 10 is equivalent to a current source A for subsequent rectifier circuit 14, the output capacitor $C_o$ and the load. The rectifier circuit 14 performs only AC-DC conversion, but does not change an amplitude of the relevant voltage or current. Thus, the resonance-type contactless power supply 10 functions as a current source for the load if there is no the state switching circuit 15.

The rectifier circuit 14 is electrically coupled to the receiver-side resonance circuit 13 for converting an AC current from the receiver-side resonance circuit 13 to a DC current as an output.

The rectifier circuit 14 may be a full-bridge rectifier circuit or a half-bridge rectifier circuit.

The output capacitor $C_o$ is connected in parallel at an output port of the rectifier circuit 14, for filtering the output DC current.

The state switching circuit 15 switches the resonance-type contactless power supply 10 between the first state and the second state. The inverter circuit 11 receives electric energy, and transfers electric energy to the rectifier circuit 14 in the first state and stops transferring electric energy to the rectifier circuit 14 in the second state.

Specifically, the state switching circuit 15 is placed at the receiver side in this embodiment, for controlling the receiver-side resonant circuit 13 to output an AC current to the rectifier circuit 14 in the first state, and to connect an input terminal of the rectifier circuit 14 to ground in the second state.

The state switching circuit 15 may include a first switch $S_1$ and a second switch $S_2$ for achieving its function, as shown in FIG. 1. The first switch $S_1$ is connected between a first terminal of the input port of the rectifier circuit 14 and ground. The second switch $S_2$ is connected between a second terminal of the input port of the rectifier circuit 14 and ground. In the first state, the first switch $S_1$ and the second switch $S_2$ are both turned off so that the inverter circuit 11 receives electric energy and transfers electric energy to the rectifier circuit 14 by resonance as an output. In the second state, the first switch $S_1$ and the second switch $S_2$ are both turned on so that the input port of the rectifier circuit 14 is grounded. The current at the input port of the rectifier circuit 14 further flows to ground, instead of the rectifier circuit 14 itself.

The control circuit 16 switches the state switching circuit 15 between the first state and the second state so that the rectifier circuit 14 outputs a constant voltage Vout.

Specifically, the control circuit 16 outputs a switching control signal Q in response to a feedback voltage $V_{fb}$, for turning on or off the first switch $S_1$ and the second switch $S_2$ simultaneously.

In this embodiment, the feedback voltage $V_{fb}$ may be obtained from the output voltage $V_{out}$ of the rectifier circuit 14, i.e. the output voltage of the resonance-type contactless power supply, by a voltage division network. Thus, the feedback voltage $V_{fb}$ is in proportion to the output voltage $V_{out}$.

Figure 6:
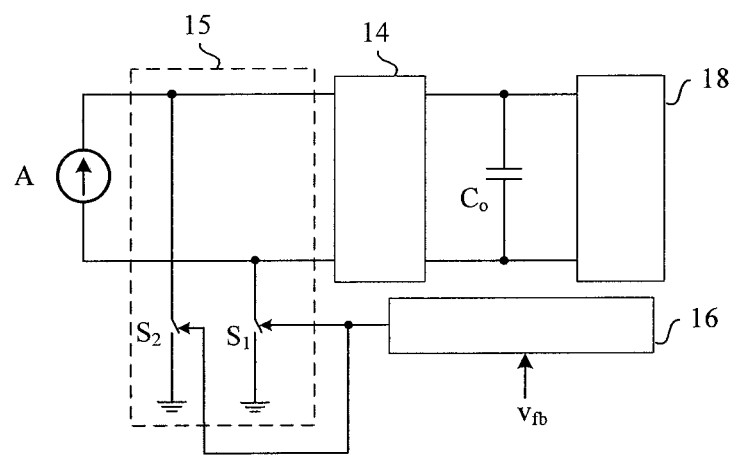
FIG. 6 is a schematic diagram of an example resonance-type contactless power supply according to a first embodiment of the present disclosure.

FIG. 6 is a schematic diagram of an example resonance-type contactless power supply according to a first embodiment of the present disclosure. As shown in FIG. 6, the resonance and magnetic coupling circuit is equivalent to a current source A. The state switching circuit 15 is connected to the input port of the rectifier circuit 14, i.e. an output port of the current source A, so that the input port is grounded or in a normal state.

The control circuit 16 is electrically coupled to a control terminal of the state switching circuit 15. The control circuit 16 obtains a compensation signal $V_c$ by calculating an error between the feedback voltage $V_{fb}$ and a reference voltage $V_{ref}$. The compensation signal $V_c$ is compared with a triangular wave signal $V_{ramp}$ to provide a pulse-width modulation signal PWM. A switching control signal Q is then obtained from the pulse-width modulation signal PWM, for turning on or off the first switch $S_1$ and the second switch $S_2$ of the state switching circuit 15 simultaneously.

The control circuit 16 controls a ratio of a first time period during which the state switching circuit 11 is in the first state and a second time period during which the state switching circuit 11 is in the second state, so that the rectifier circuit 14 outputs a constant voltage $V_{out}$. In the first state, electric energy is transferred to the rectifier circuit 14. In the second state, electric energy is not transferred to the rectifier circuit 14, and an input voltage of the rectifier circuit 14 is equal to 0. The output voltage of the rectifier circuit is filtered and averaged by the output capacitor $C_o$ to have a relatively constant output voltage $V_{out}$.

The control circuit 16 may include an error amplifier circuit 16a, a comparator CMP and a driving circuit DR.

The error amplifier circuit 16a receives the feedback voltage $V_{fb}$ and the reference voltage $V_{ref}$ and to provide an error compensation signal $V_c$. The error amplifier circuit 16a may include an error amplifier EA and a compensation capacitor Cc. In this embodiment, an inverting input terminal and a non-inverting input terminal of the error amplifier EA receive the feedback voltage $V_{fb}$ and the reference voltage $V_{ref}$, respectively.

The comparator CMP compares the error compensation signal $V_c$ and the triangular wave signal $V_{ramp}$ to provide the pulse-width modulation signal PWM. The pulse-width modulation signal PWM has a duty ratio D which varies in accordance with the error compensation signal $V_c$ and has a frequency equal to that of the triangular wave signal $V_{ramp}$. In this embodiment, an inverting input terminal and a non-inverting input terminal of the comparator CMP receive the error compensation signal $V_c$ and the triangular wave signal $V_{ramp}$, respectively.

It will be understood by one skilled person that the above input signals may be reversed if the control signal is defined in other manner. For example, the inverting input terminal and the non-inverting input terminal of the comparator CMP receive the triangular wave signal $V_{ramp}$ and the error compensation signal $V_c$, respectively.

The driving circuit DR provides switching control signal Q for the first switch $S_1$ and the second switch $S_2$ in response to the pulse-width modulation signal PWM.

The control circuit 16 forms a voltage control loop to achieve negative feedback. When the output voltage $V_{out}$ increases, the feedback voltage $V_{fb}$ increases so that the compensation signal $V_c$ decreases. The pulse-width modulation signal PWM from the comparator CMP has a low level when the triangular wave signal $V_{ramp}$ is below the compensation signal $V_c$, and has a high level when the triangular wave signal $V_{ramp}$ is above the compensation signal $V_c$. When the compensation signal $V_c$ decreases, the duty ratio D increases because a time period of high level increases and a time period of low level decreases in a cycle of the pulse-width modulation signal. An on time of the first switch $S_1$ and the second switch $S_2$ in each pulse-width modulation cycle increases, and a time period during which the current source A supplies electric energy to the rectifier circuit 14 decreases. Consequently, electric energy per unit time, which is supplied to the rectifier circuit 14, decreases, and the output voltage $V_{out}$ decreases.

Instead, the control circuit 16 decreases the duty ratio of the pulse-width modulation signal PWM when the output voltage $V_{out}$ decreases, so that electric energy per unit time which is supplied to the rectifier circuit 14 increases and the output voltage $V_{out}$ increases to maintain a constant output voltage.

The above embodiment is described in an example that the switching control signal Q from the driving circuit DR is used for turning on the first switch $S_1$ and the second switch $S_2$ when the pulse-width modulation signal PWM has a high level. Alternatively, the switching control signal Q from the driving circuit DR is used for turning on the first switch $S_1$ and the second switch $S_2$ when the pulse-width modulation signal PWM has a low level. In such case, input terminals of the comparator may be exchanged, which is an equivalent of the above embodiment, as well known by one skilled person.

Moreover, it will be understood by one skilled person that the control circuit as shown in FIG. 1 is given only as an example and can be replaced by various types of conventional negative feedback voltage control loops, as long as these control loops can adjust a duty ratio of the pulse-width modulation signal in response to a feedback voltage for controlling a ratio of a first time period in the first state and a second time period in the second state to provide a constant output voltage.

Furthermore, the switching control signal Q has a frequency (i.e. the frequency of the pulse-width modulation signal PWM) which should be smaller than a self-inductance resonance frequency, so that switching operation will not interfere with energy transfer between the transmitter-side resonant circuit 12 and the receiver-side resonant circuit 13.

Furthermore, the rectifier circuit 14, the state switching circuit 15 and the control circuit 16 in the resonance-type contactless power supply 10 according to this embodiment may be integrated as one integrated circuit. On the basis of the integrated circuit, the power receiver can be easily formed by adding peripheral components such as the receiving coil, the receiver-side resonant capacitor, and the like.

The inverter receives electric energy, which is transferred to the rectifier circuit in a first state and is not transferred to the rectifier circuit in a second state. By switching between the first state and the second state, the resonance-type contactless power supply is controlled to provide a relatively constant voltage, and can be electrically coupled directly to a constant-voltage-type load 18.

Figure 7:
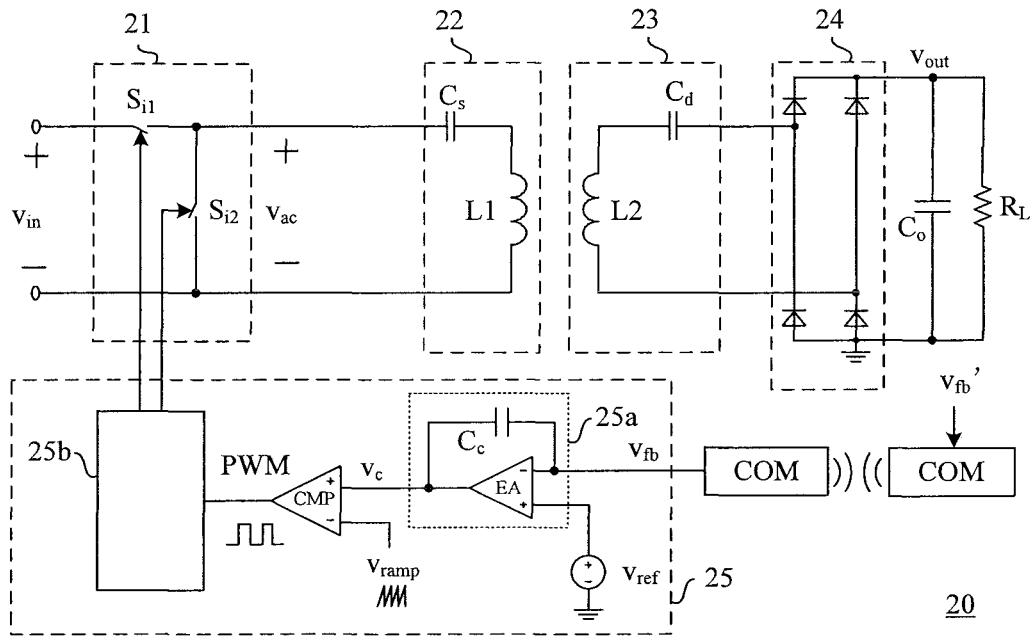
FIG. 7 is a schematic circuit diagram of an example resonance-type contactless power supply according to a second embodiment of the present disclosure.

FIG. 7 is a schematic circuit diagram of an example resonance-type contactless power supply according to a second embodiment of the present disclosure. As shown in FIG. 7, a resonance-type contactless power supply 20 according to this embodiment includes an inverter 21, a transmitter-side resonant circuit 22, a receiver-side resonant circuit 23, a rectifier circuit 24, an output capacitor $C_o$ and a control circuit 25.

The transmitter-side resonant circuit 22, the receiver-side resonant circuit 23, the rectifier circuit 24 and the output capacitor $C_o$ are arranged and connected to each other in the same manner as in the first embodiment.

However, this embodiment differs from the first and second embodiment in that there is no a state switching circuit. The control circuit 25 controls the inverter 21 to operate or to stop its operation, so that electric energy is or is not transferred to the rectifier circuit.

Specifically, the inverter 21 receives electric energy and outputs an AC current with a self-inductance resonance frequency in a first state, and stops its operation in a second state.

The inverter 21 may be a full-bridge inverter, or a half-bridge inverter. Preferably, the inverter 21 is a half-bridge inverter as shown in FIG. 7, including a first inverter switch $S_{i1}$ and a second switch $S_{i2}$. The first inverter switch $S_{i1}$ is connected between a power input terminal and a first terminal of an output port of the inverter 21. The second inverter switch $S_{i2}$ is connected between the first terminal and a second terminal of the output port of the inverter 21. By turning on or off the first inverter switch $S_{i1}$ and the second inverter switch $S_{i2}$, a DC current at the power input terminal can be converted into an AC current with a frequency equal to that of a switching frequency of the inverter.

The control circuit 25 switches the inverter circuit 21 between the first state and the second state to provide a constant output voltage $V_{out}$ of the rectifier circuit 24, i.e. an output voltage of the resonance-type contactless power supply.

The control circuit 25 may include an error amplifier circuit 25a, a comparator CMP and an inverter controller 25b.

The error amplifier circuit 25a receives a feedback voltage $V_{fb}$ and a reference voltage $V_{ref}$ and to provide an error compensation signal $V_c$.

In this embodiment, the feedback voltage $V_{fb}$, may be obtained from the output voltage $V_{out}$ of the rectifier circuit 24, i.e. the output voltage of the resonance-type contactless power supply, by a voltage division network and a wireless communication circuit for transmitting a relevant signal $V_{fb}'$ from the power receiver to the power transmitter. Thus, the feedback voltage $V_{fb}$ is in proportion to the output voltage $V_{out}$.

The comparator CMP compares the error compensation signal $V_c$ with a triangular wave signal $V_{ramp}$ to provide a pulse-width modulation signal PWM.

The inverter controller 25b switches between the first state and the second state in response to the pulse-width modulation signal PWM. The inerter controller provides an inverter control signal which has the self-inductance resonance frequency in the first state and stops an operation of the inverter in the second state. Preferably, the inverter controller 25b has an enable terminal for receiving the pulse-width modulation signal PWM, and operates in the first state (an operation state) or in the second state (a non-operation state) in response to the pulse-width modulation signal PWM.

The inverter controller 25b provides an inverter control signal with a frequency equal to a self-inductance resonance frequency in a predetermined manner when it operates. Thus, the inverter 21 provides an AC current and the transmitter-side resonant circuit 22 resonates, to transfer electric energy to receiver-side resonant circuit 23 and then to the rectifier circuit 24 as an output.

The inverter 21 does not provide an AC current when the inverter controller 25b stops operation. In such case, electric energy is not transferred from the transmitter-side resonant circuit 22 to the rectifier circuit 24.

The control circuit 25 forms a voltage control loop to achieve negative feedback. When the output voltage $V_{out}$ increases, the feedback voltage $V_{fb}$ increases so that the compensation signal $V_c$ decreases. The pulse-width modulation signal PWM from the comparator CMP has a low level when the triangular wave signal $V_{ramp}$ is below the compensation signal $V_c$, and has a high level when the triangular wave signal $V_{ramp}$ is above the compensation signal $V_c$. As shown in FIG. 7, an inverting terminal and a non-inverting terminal of the comparator 25a receive a triangular wave signal $V_{ramp}$ and an error compensation signal $V_c$, respectively. When the compensation signal $V_c$ decreases, the duty ratio decreases because a time period of low level increases and a time period of high level decreases in a cycle of the pulse-width modulation signal. An operation time of the inverter 21 in each pulse-width modulation cycle decreases, and a time period during which the inverter 21 supplies electric energy to the rectifier circuit 24 decreases. Consequently, electric energy per unit time, which is supplied to the rectifier circuit 24, decreases, and the output voltage $V_{out}$ decreases.

Instead, the control circuit 25 increases the duty ratio D of the pulse-width modulation signal when the output voltage $V_{out}$ increases, so that electric energy per unit time which is supplied to the rectifier circuit 24 increases and the output voltage $V_{out}$ increases to maintain a constant output voltage.

The above embodiment is described in an example that the inverter controller is in an operation state (i.e. the first state) when the pulse-width modulation signal PWM has a high level. Alternatively, the inverter controller is in an operation state (i.e. the first state) when the pulse-width modulation signal PWM has a low level. In such case, input terminals of the comparator may be exchanged, which is an equivalent of the above embodiment, as well known by one skilled person.

Moreover, it will be understood by one skilled person that the control circuit as shown in FIG. 7 is given only as an example and can be replaced by various types of conventional negative feedback voltage control loops, as long as these control loops can adjust a duty ratio of the pulse-width modulation signal in response to a feedback voltage for controlling a ratio of a first time period in the first state and a second time period in the second state to provide a constant output voltage.

Furthermore, the pulse-width modulation signal PWM has a frequency which should be smaller than a self-inductance resonance frequency, so that switching operation will not interfere with energy transfer between the transmitter-side resonant circuit 22 and the receiver-side resonant circuit 23.

Furthermore, the inverter circuit 21 and the control circuit 25 in the resonance-type contactless power supply 20 according to this embodiment may be integrated as one integrated circuit. On the basis of the integrated circuit, the power transmitter can be easily formed by adding peripheral components such as the transmitting coil, the transmitter-side resonance capacitor, wireless signal receiver, and the like.

In this resonance-type contactless power supply, the inverter receives electric energy and transfers it to the rectifier circuit in a first state, and does not receive electrical energy or does not transfer it to the rectifier circuit in a second state. By switching between the first state and the second state, the resonance-type contactless power supply is controlled to provide a relatively constant voltage, and can be electrically coupled directly to a constant-voltage-type load.

This embodiment further reduces the number of components, and thus reduces circuit cost.

Figure 8:
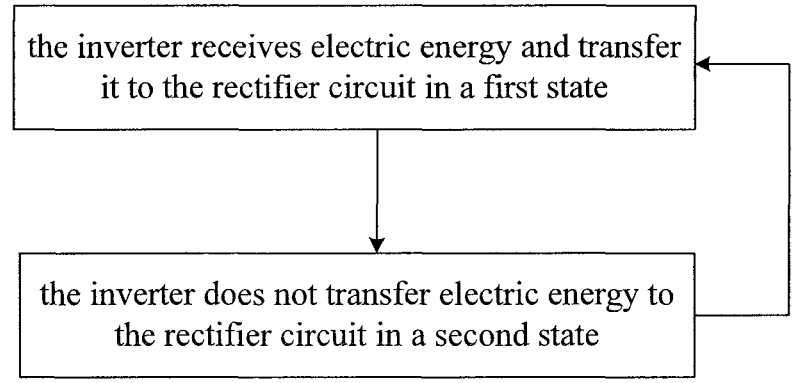
FIG. 8 is a flow chart of an example constant voltage control method for a resonance-type contactless power supply according to a third embodiment of the present disclosure.

FIG. 8 is a flow chart of an example constant voltage control method for a resonance-type contactless power supply according to a third embodiment of the present disclosure. The resonance-type contactless power supply comprises an inverter, a transmitter-side resonant circuit, a receiver-side resonant circuit, a rectifier circuit and an output capacitor. As shown in FIG. 8, the method comprises the following steps:

switching the resonance-type contactless power supply between the first state and the second state so that the resonance-type contactless power supply outputs a constant voltage, wherein the inverter receives electric energy, which is transferred to the rectifier circuit in a first state and is not transferred to the rectifier circuit in a second state.

A pulse-width modulation signal is used for switching control. The output voltage maintains a constant value by adjusting the duty ratio of the pulse-width modulation signal.

In one preferable embodiment, a receiver-side resonant circuit outputs an AC current to the rectifier circuit in the first state, and an input terminal of the rectifier circuit is grounded in the second state.

In another preferable embodiment, the inverter circuit receives electric energy and outputs an AC current with a self-inductance resonance frequency in the first state, and the inverter stops its operation in the second state.

In this resonance-type contactless power supply, the inverter receives electric energy, which is transferred to the rectifier circuit in a first state and is not transferred to the rectifier circuit in a second state. By switching between the first state and the second state, the resonance-type contactless power supply is controlled to provide a relatively constant voltage, and can be electrically coupled directly to a constant-voltage-type load.

The foregoing descriptions of specific embodiments of the present disclosure have been presented, but are not intended to limit the disclosure to the precise forms disclosed. It will be readily apparent to one skilled in the art that many modifications and changes may be made in the present disclosure. Any modifications, equivalence, variations of the preferred embodiments can be made without departing from the doctrine and spirit of the present disclosure.

What is claimed is:

1. A resonance-type contactless power supply comprising:
    an inverter configured to receive electric energy and output an AC current with a self-inductance resonance frequency in a first state, and to stop its operation in a second state;
    a transmitter-side resonant circuit comprising a transmitting coil for receiving said AC current from said inverter;
    a receiver-side resonant circuit comprising a receiving coil which is separated from but electrically coupled to said transmitting coil in a contactless manner, and configured to receive electric energy from said transmitting coil;
    a rectifier circuit being electrically coupled to said receiver-side resonant circuit;
    an output capacitance being connected in parallel at an output of said rectifier circuit; and
    a control circuit configured to switch said inverter between said first state and said second state so that said rectifier circuit outputs a constant output voltage,
    wherein under said first state, switches included in the inverter are controlled by said control circuit in accordance with a feedback voltage of said output voltage, so as to generate said AC current based on said electric energy,
    under said second state, said switches included in the inverter are controlled by said control circuit in accordance with said feedback voltage, so as to stop generating said AC current.

2. The resonance-type contactless power supply according to claim 1, wherein said control circuit is configured to switch said inverter between said first state and said second state in response to said feedback voltage, so as to decrease a time period during which said inverter maintains in said first state when said feedback voltage increases, and to increase said time period during which said inverter maintains in said first state when said feedback voltage decreases.

3. The resonance-type contactless power supply according to claim 1, wherein said control circuit comprises:
    an error amplifier circuit configured to receive said feedback voltage which is in proportion to said output voltage of said rectifier circuit and a reference voltage and to provide an error compensation signal;
    a comparator configured to compare said error compensation signal with a triangular wave signal to provide a pulse-width modulation signal; and
    an inverter controller configured to control said switches included in said inverter, so as to switch between said first state and said second state in response to said pulse-width modulation signal, and to provide an inverter control signal which has said self-inductance resonance frequency to said switches in said first state and stops an operation of said inverter in said second state.

4. The resonance-type contactless power supply according to claim 1, wherein said transmitting coil and said receiving coil are configured to be coupled to each other in a predetermined coupling coefficient, and when operating in said self-inductance resonance frequency, a mutual inductance between said transmitting coil and said receiving coil is equal to an equivalent load impedance of a rated load in said first state.

5. An integrated circuit for a resonance-type contactless power supply comprising:
   an inverter configured to receive electric energy and output an AC current with a self-inductance resonance frequency in a first state, and to stop its operation in a second state; and
   a control circuit configured to switch said inverter between said first state and said second state so that said resonance-type contactless power supply outputs a constant output voltage,
   wherein under said first state, switches included in the inverter are controlled by said control circuit in accordance with a feedback voltage of said output voltage, so as to generate said AC current based on said electric energy,
   under said second state, said switches included in the inverter are controlled by said control circuit in accordance with said feedback voltage, so as to stop generating said AC current.

6. The integrated circuit according to claim 5, wherein said control circuit is configured to switch said inverter between said first state and said second state in response to said feedback voltage, so as to decrease a time period during which said inverter maintains in said first state when said feedback voltage increases, and to increase said time period during which said inverter maintains in said first state when said feedback voltage decreases.

7. The integrated circuit according to claim 5, wherein said control circuit comprises:
   an error amplifier circuit configured to receive said feedback voltage which is in proportion to said output voltage of said resonance-type contactless power supply and a reference voltage and to provide an error compensation signal;
   a comparator configured to compare said error compensation signal with a triangular wave signal to provide a pulse-width modulation signal; and
   an inverter controller configured to control said switches included in the inverter, so as to switch said switches between said first state and said second state in response to said pulse-width modulation signal and to provide an inverter control signal which has said self-inductance resonance frequency in said first state and stops an operation of said inverter in said second state.

8. A constant voltage control method for a resonance-type contactless power supply comprising an inverter, a transmitter-side resonant circuit, a receiver-side resonant circuit, a rectifier circuit and an output capacitor, comprising:
   switching said resonance-type contactless power supply between said first state and said second state so that said resonance-type contactless power supply outputs a constant output voltage,
   wherein said inverter receives electric energy, which is transferred to said rectifier circuit in a first state and is not transferred to said rectifier circuit in a second state,
   wherein under said first state, switches included in the inverter are controlled in accordance with a feedback voltage of said output voltage, so as to generate an AC current based on electric energy,
   under said second state, said switches included in the inverter are controlled in accordance with said feedback voltage, so as to stop generating said AC current.

9. The constant voltage control method according to claim 8, wherein said inverter receives electric energy and outputs said AC current with a self-inductance resonance frequency in said first state, and said inverter stops its operation in said second state.

* * * * *